United States Patent
Tsubota

(10) Patent No.: US 8,164,295 B2
(45) Date of Patent: Apr. 24, 2012

(54) STEPPING MOTOR CONTROLLING DEVICE, METHOD, AND STORAGE MEDIUM

(75) Inventor: Hirokazu Tsubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 450 days.

(21) Appl. No.: 12/427,975

(22) Filed: Apr. 22, 2009

(65) Prior Publication Data

US 2010/0141200 A1 Jun. 10, 2010

(30) Foreign Application Priority Data

Dec. 8, 2008 (JP) .................................. 2008-312412

(51) Int. Cl.
*H02P 8/40* (2006.01)
(52) U.S. Cl. .......... 318/696; 318/66; 318/111; 318/115; 318/255
(58) Field of Classification Search .................. 318/685, 318/95, 111, 696, 112
See application file for complete search history.

(56) References Cited

U.S. PATENT DOCUMENTS

| | | | |
|---|---|---|---|
| 4,518,900 A * | 5/1985 | Nawata | 318/102 |
| 5,670,855 A * | 9/1997 | Okunishi | 318/696 |
| 5,739,648 A * | 4/1998 | Ellis et al. | 318/112 |
| 6,175,607 B1 * | 1/2001 | Shiba et al. | 377/16 |
| 2007/0285034 A1 * | 12/2007 | Aizawa | 318/34 |

FOREIGN PATENT DOCUMENTS

| | | |
|---|---|---|
| JP | A-54-153218 | 12/1979 |
| JP | U-3-101200 | 10/1991 |
| JP | A-8-156354 | 6/1996 |
| JP | A-10-285994 | 10/1998 |

OTHER PUBLICATIONS

Japanese Office Action issued in Japanese Patent Application No. 2008-312412 on Sep. 14, 2010 (with translation).

* cited by examiner

*Primary Examiner* — Walter Benson
*Assistant Examiner* — Bryan Gordon
(74) *Attorney, Agent, or Firm* — Oliff & Berridge, PLC

(57) ABSTRACT

A stepping motor controlling device includes first and second clock signal generators, plural drivers, and a controller. The first clock signal generator generates a reference clock signal for rotationally driving of plural stepping motors. The second clock signal generator generates, on the basis of the reference clock signal, for each of the stepping motors, speed control clock signals. The plural drivers are provided respectively for the stepping motors and, on the basis of the speed control clock signals for the respective stepping motors, generate pulse excitation signals and input the pulse excitation signals to the stepping motors to rotationally drive the stepping motors. The controller controls the second clock signal generator to generate the speed control clock signals such that phases of the respective speed control clock signals for the stepping motors differ from one another.

9 Claims, 14 Drawing Sheets

STEPPING MOTOR CONTROLLING DEVICE, METHOD, AND STORAGE MEDIUM

CROSS-REFERENCE TO RELATED APPLICATION

This application is based on and claims priority under 35 USC 119 from Japanese Patent Application No. 2008-312412 filed on Dec. 8, 2008.

BACKGROUND

1. Technical Field

The present invention relates to a stepping motor controlling device, method, and storage medium.

2. Related Art

Conventionally, there are plural sheet feeding devices used with an image forming device, that have stepping motors, circuits that drive the stepping motors, and circuits that are connected to the driving circuits and control the rotation of the stepping motors. A technique has been proposed in which the control circuits within the sheet feeding devices receive synchronization signals from the image forming device that is connected to the sheet feeding devices, and synchronize the stepping motors within the sheet feeding devices with the synchronization signals, and drive the respective stepping motors at different phases.

The stepping motor may be called a step motor, a pulse motor, a stepper motor, or the like, but throughout here, it will be referred to as a stepping motor.

SUMMARY

An aspect of the present invention is a stepping motor controlling device having: a first clock signal generator that generates a reference clock signal that is a reference for operation timings of rotationally driving plural stepping motors; a second clock signal generator that, on the basis of the reference clock signal, generates, for each of the plural stepping motors, speed control clock signals that determine respective rotational speeds of the stepping motors; plural drivers that are provided respectively for the plural stepping motors, and that, on the basis of the speed control clock signals for the respective stepping motors, generate pulse excitation signals and input the pulse excitation signals to the stepping motors to rotationally drive the stepping motors; and a controller that controls the second clock signal generator to generate the speed control clock signals such that phases of the respective speed control clock signals for the plural stepping motors differ from one another.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
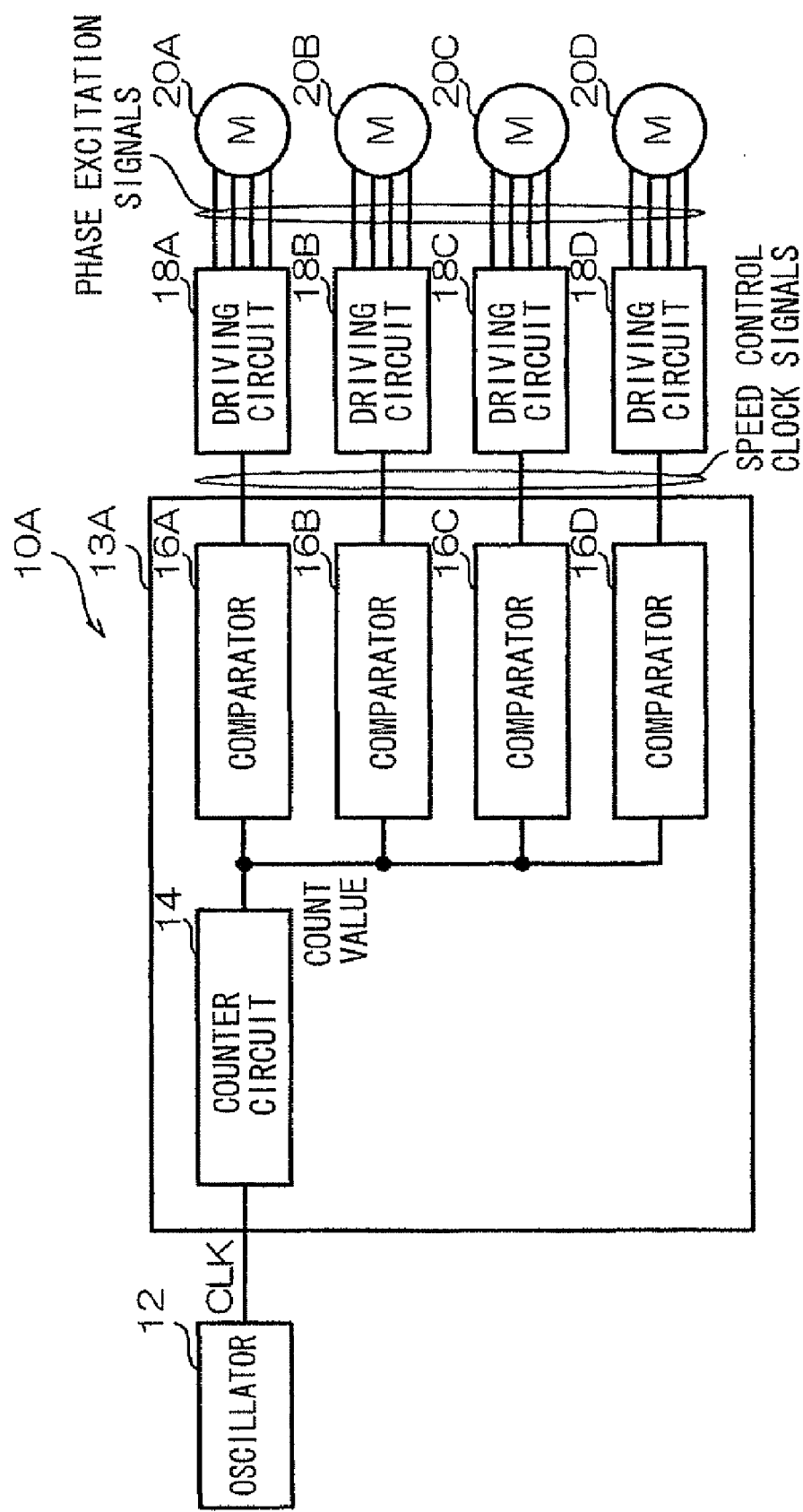
FIG. 1 is a block diagram showing the structure of a stepping motor controlling device relating to a first exemplary embodiment.

The structure of a stepping motor controlling device 10A relating to the exemplary embodiment is shown in FIG. 1.

As shown in FIG. 1, the stepping motor controlling device 10A has an oscillator 12, a speed control clock signal generator 13A, and plural driving circuits (four driving circuits 18A through 18D).

The oscillator 12 generates a reference clock signal CLK that is a reference for the operation timings of the rotational driving of plural stepping motors (four stepping motors 20A through 20D) that are objects of control.

On the basis of the reference clock signal CLK generated by the oscillator 12, the speed control clock signal generator 13A generates, for the plural stepping motors respectively, speed control clock signals that determine the rotational speeds of the stepping motors 20A through 20D.

Driving circuits 18A through 18D are provided so as to correspond to the stepping motors 20A through 20D, respectively. The speed control clock signal for the corresponding stepping motor is inputted to the driving circuit 18A through 18D, and, on the basis of the inputted speed control clock signal, the driving circuit generates a phase excitation signal for the corresponding stepping motor and inputs the signal to the stepping motor, thereby rotationally driving the stepping motor.

The stepping motor controlling device 10A relating to the present exemplary embodiment is described here as a device that controls stepping motors that are provided at plural places of a multifunction device having the plural functions of a copier, a printer (image forming device), a fax machine, and the like. However, the stepping motor controlling device 10A is not limited to the same, and may be applied to another device that has plural stepping motors.

The objects of control of the stepping motor controlling device 10A relating to the present exemplary embodiment are the two phase excitation system stepping motors 20A through 20D. However, the stepping motor controlling device 10A is not limited to the same, and stepping motors of other systems such as three phase excitation system, four phase excitation system, five phase excitation system stepping motors may be the objects of control.

The speed control clock signal generator 13A relating to the present exemplary embodiment has a counter circuit 14 and plural comparators (four comparators 16A through 16D).

The reference clock signal CLK is inputted to the counter circuit 14, and the counter circuit 14 counts the number of pulses of the reference clock signal CLK.

The comparators 16A through 16D are provided so as to correspond to the stepping motors 20A through 20D, respectively. The count value counted by the counter circuit 14 is inputted to the comparators 16A through 16D. Count value range information (data), that expresses a range of the count value, are set in advance at the comparators 16A through 16D. The comparator 16A through 16D compares the inputted count value and the range of the count value, and if the inputted count value is outside of the count value range, the comparator 16A through 16D generates pulses, and thereby generates the speed control clock signal.

Figure 2:
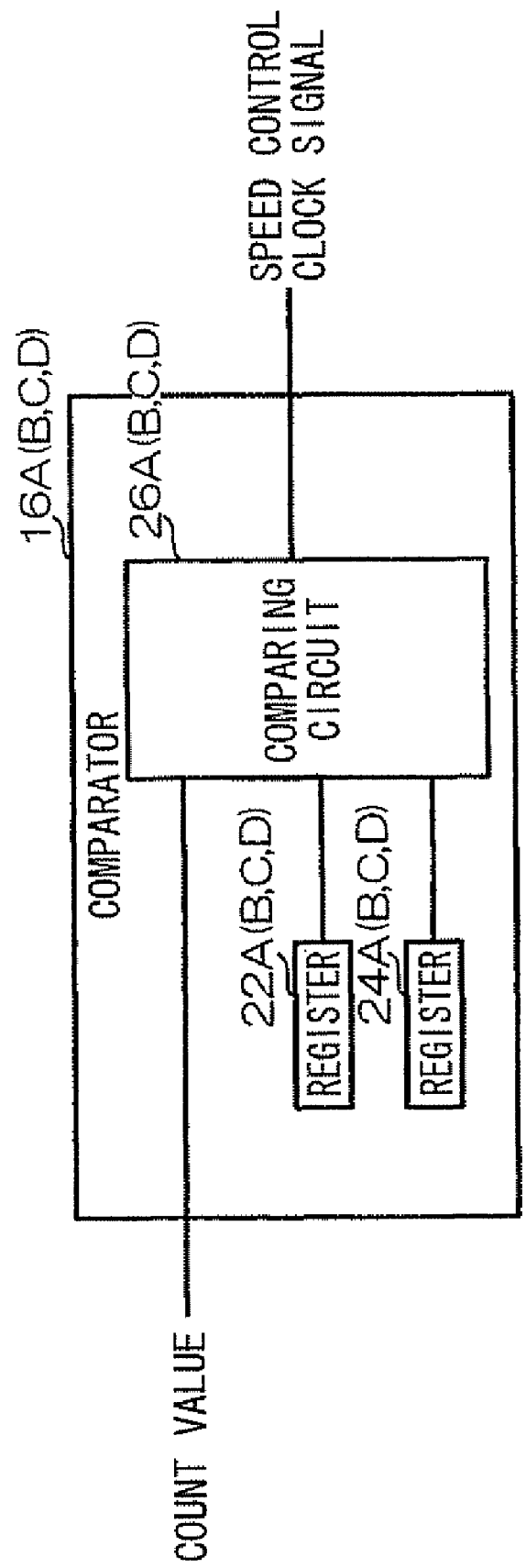
FIG. 2 is a block diagram showing the structure of a comparator relating to the first and third exemplary embodiments.

As shown in FIG. 2, the comparator 16A has a register 22A and a register 24A that are a pair, and a comparing circuit 26A.

The count value range data is set in advance in the register 22A and the register 24A. The lower limit value of the count value range data is set in the register 22A, and the upper limit value of the count value range data is set in the register 24A.

On the other hand, the output terminal of the counter circuit 14 that outputs the count value, and the output terminals of the registers 22A, 24A are connected to the comparing circuit 26A. The comparing circuit 26A compares the count value inputted from the counter circuit 14 and the range of the count value set in advance in the registers 22A, 24A. If the inputted count value is outside of the range of the count value expressed by the count value range data, the comparing circuit 26A generates pulses, and thereby generates a speed control clock signal.

Because the structures of the comparators 16B through 16D are similar to that of the comparator 16A, description thereof is omitted.

Next, the main structure of the electrical system of the stepping motor controlling device 10A will be described with reference to FIG. 3.

Figure 3:
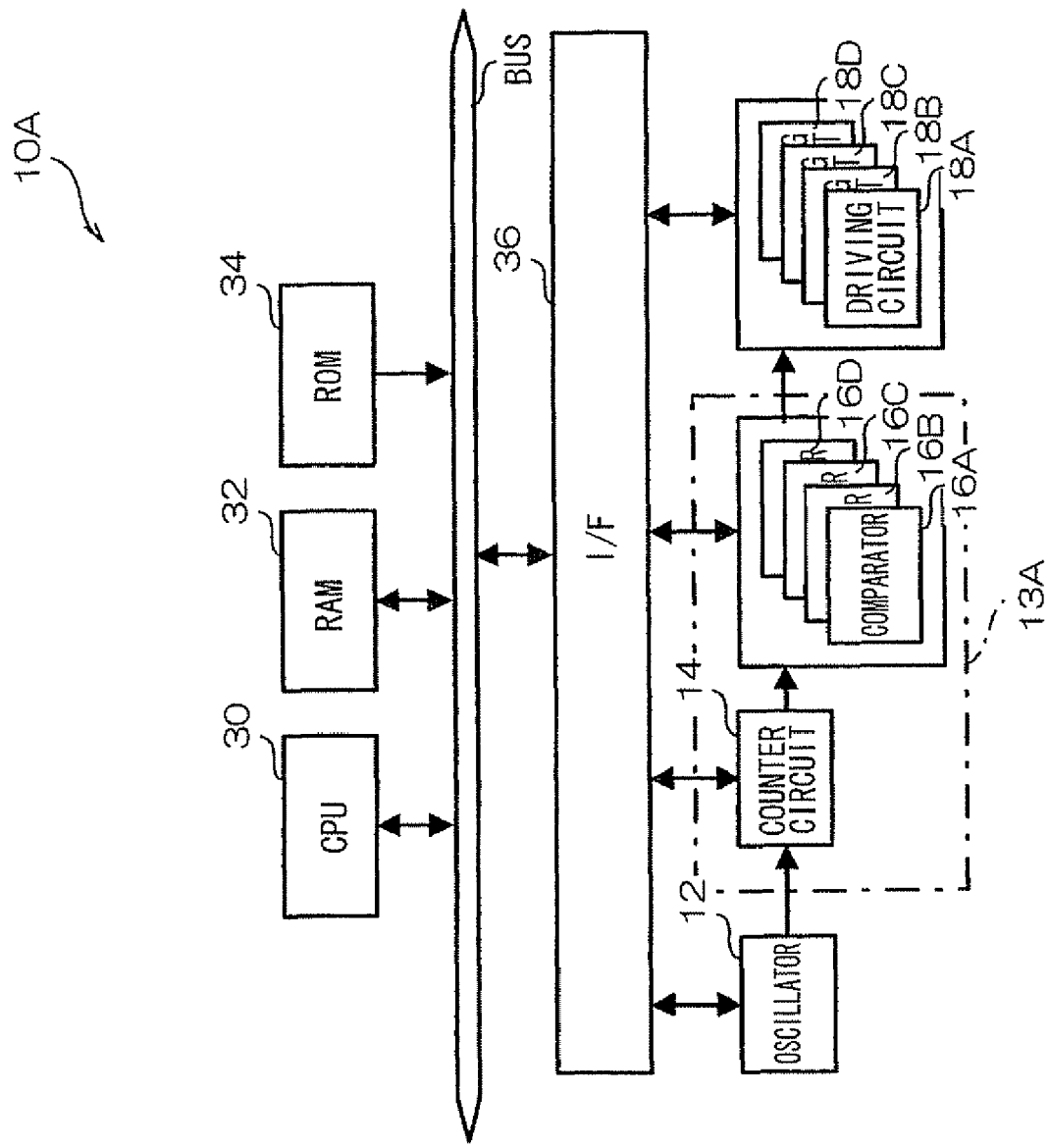
FIG. 3 is a block diagram showing the structure of main portions of an electrical system of the stepping motor controlling device relating to the first exemplary embodiment.

As shown in FIG. 3, a Central Processing Unit (CPU) 30 that governs the overall operations of the stepping motor controlling device 10A, a Random Access Memory (RAM) 32 that is used as a work area or the like when various programs are executed by the CPU 30, and a Read Only Memory (ROM) 34 in which various types of data such as various programs and parameters are stored in advance, are provided at the stepping motor controlling device 10A. These respective sections are electrically connected via a system BUS. Accordingly, the CPU 30 can access the RAM 32 and the ROM 34.

On the other hand, the oscillator 12, the counter circuit 14, the comparators 16A through 16D and the driving circuits 18A through 18D are electrically connected to the system BUS via an interface (I/F) 36. Accordingly, the CPU 30 can control the operations of these respective sections via the I/F 36.

Figure 4:
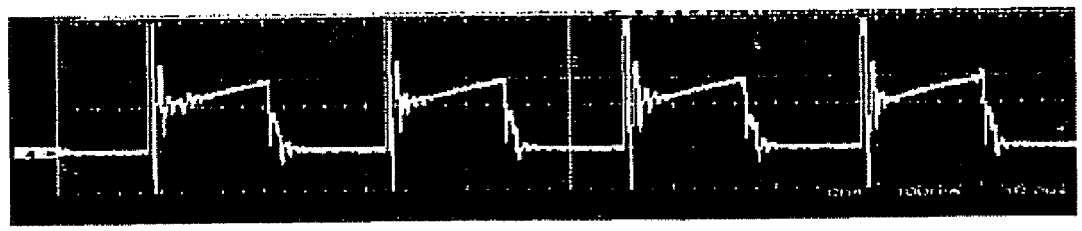
FIG. 4 is a waveform diagram showing an example of results of measurement of a phase excitation signal that is inputted to a stepping motor.
Figure 5:
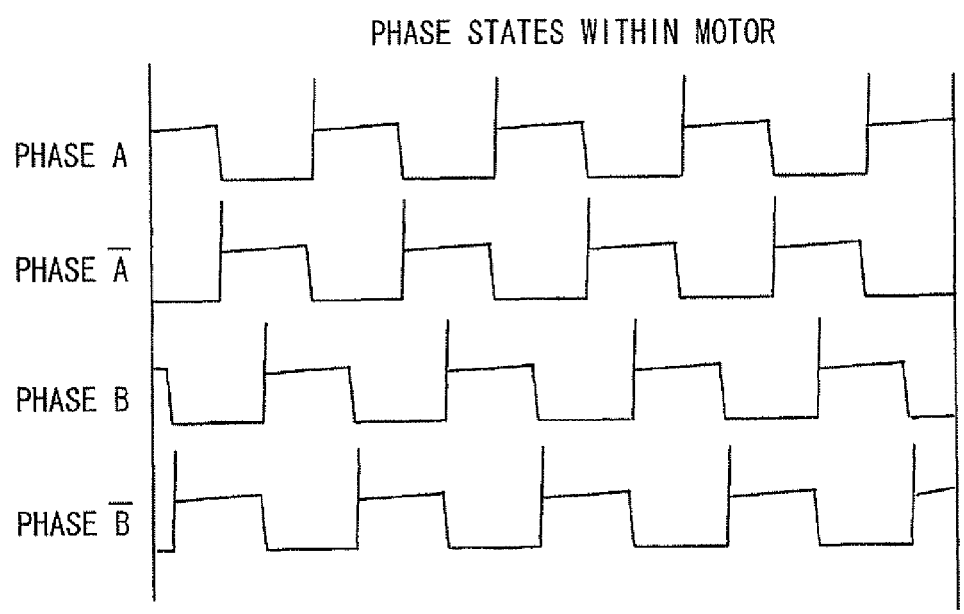
FIG. 5 is a waveform diagram showing examples of states of respective phase excitation signals in a two phase excitation system stepping motor.

As shown in FIG. 4 as an example, in the phase excitation signal that is inputted to the stepping motor, a sudden waveform change (change in current) arises at the time of phase switching (in FIG. 4, at the time of the rise of the pulse). This occurs because back electromotive force is generated at the stepping motor when the current is cut off in order to switch to the next phase. FIG. 4 shows the results of actual measurement of a phase excitation signal of one phase. The respective phase excitation signals in the case of a two phase excitation system stepping motor will be, for example, the states shown in FIG. 5.

Since the stepping motor controlling device 10A relating to the present exemplary embodiment is to control plural stepping motors, when the timings of the rises of the pulses are the same or substantially the same in at least two of the plural phase excitation signals that are generated in correspondence with the respective stepping motors, the aforementioned sudden waveform changes arising due to the back electromotive forces of the stepping motors will be overlapped. As a result, the load on an unillustrated power supply circuit, that supplies the electric power used in order to generate the phase excitation signals, becomes large.

Thus, in the stepping motor controlling device 10A, the four speed control clock signals that are generated in correspondence with the stepping motors 20A through 20D are generated such that the respective phases thereof are different from one another.

Figure 6:
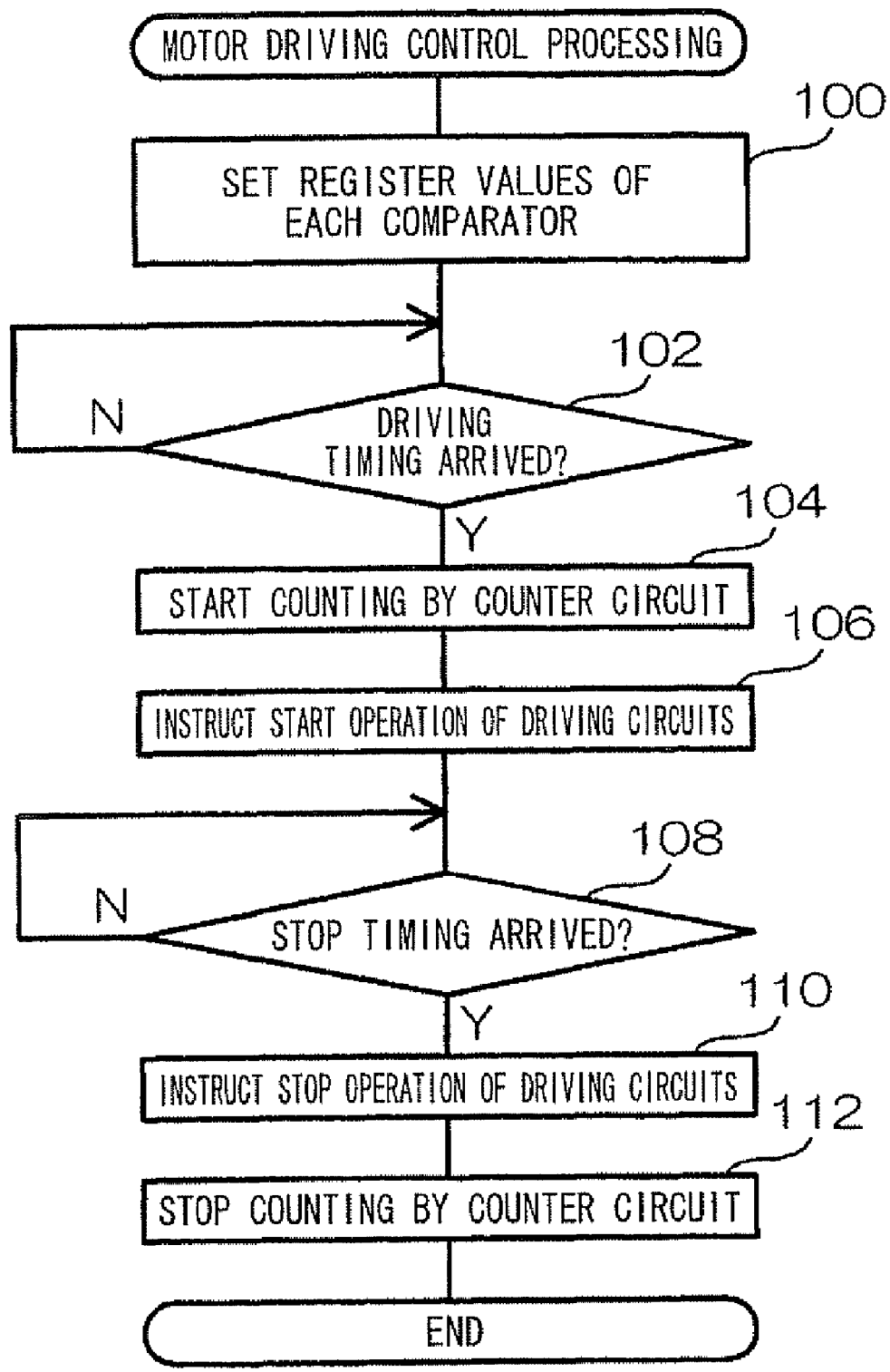
FIG. 6 is a flowchart showing the flow of a motor driving control processing program relating to the first exemplary embodiment.

Operation of the stepping motor controlling device 10A will be described next with reference to FIG. 6. FIG. 6 is a flowchart showing the flow of a motor driving control processing program that is executed by the CPU 30 of the stepping motor controlling device 10A. This program is stored in advance in a predetermined region of the ROM 34. To simplify explanation, description will be given of a case in which rotation of the respective stepping motors 20A through 20D is started at substantially the same timing, and the rotation is stopped at substantially the same timing.

First, in step 100 of FIG. 6, the count value range data is set in the registers 22A, 24A that are provided at the comparator 16A, registers 22B, 24B that are provided at the comparator 16B, registers 22C, 24C that are provided at the comparator 16C, and registers 22D, 24D that are provided at the comparator 16D.

In the stepping motor controlling device 10A, the lower limit values and the upper limit values of the count value range data are set at the pairs of registers provided at the comparators 16A through 16D such that the duty ratios of the outputted speed control clock signals will be all 50% and the phases are offset by a predetermined offset amount.

In the present exemplary embodiment, the duty ratio of the speed control clock signals is set to 50% since the stepping motors that are the objects of control are two phase excitation system stepping motors. For example, if the stepping motors that are the objects of control are one-phase excitation system stepping motors, the duty ratios may be 25%, and if they are 1-2 phase excitation system stepping motors, the duty ratios may be 37.5%.

There are cases in which the duty ratios are offset by around several percent in order to prevent through current. In this case, the difference is added to the lower limit values and the upper limit values of the count value range data, and these values are set in the pairs of registers provided at the respective comparators 16A through 16D.

In the stepping motor controlling device 10A, an amount corresponding to less than or equal to a time period obtained by dividing one period of the phase excitation signal by the number ("4" in the present exemplary embodiment) of phase excitation signals that are generated in parallel by the driving circuits 18A through 18D, is used as the predetermined offset amount. This is to suppress the occurrence of overlapping of the rises of the pulses among the respective phases, in addition to among the same phases of the respective speed control clock signals.

In step 102, the routine waits until the time of starting the rotational driving of the respective stepping motors 20A through 20D arrives. In step 104, the counter circuit 14 starts counting, and in step 106, start of operation is instructed to the respective driving circuits 18A through 18D.

In step 108, the routine waits until the time of stopping the rotational driving of the respective stepping motors 20A through 20D arrives. In step 110, stopping of operation is instructed to the respective driving circuits 18A through 18D, and in step 112, the counter circuit 14 stops counting. Thereafter, the motor driving control processing program ends.

Figure 7:
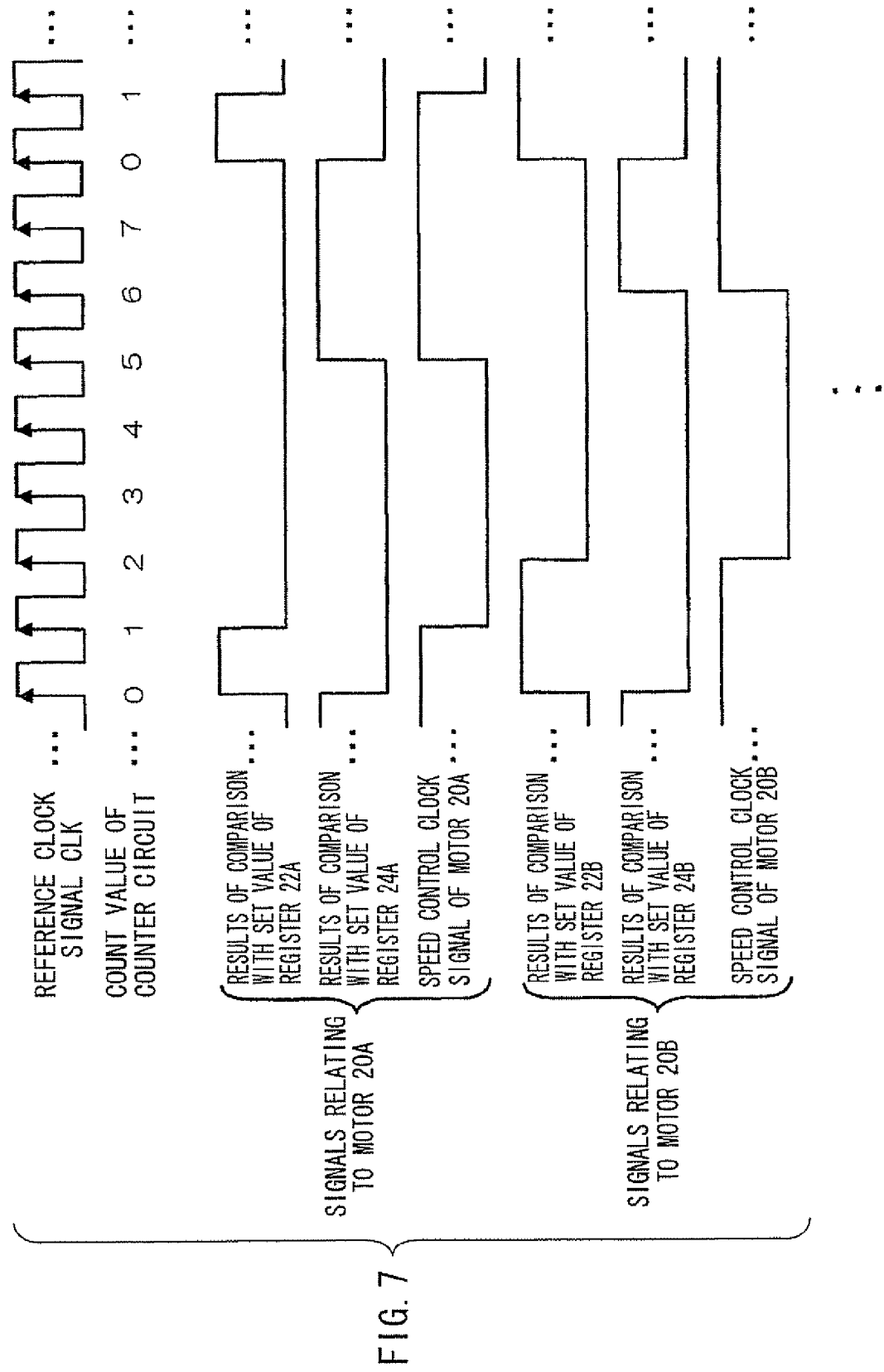
FIG. 7 is a time chart showing examples of main signals at a time of executing the motor driving control processing program relating to the first exemplary embodiment.

Examples of the main signals at the time of execution of the above-described motor driving control processing program are shown in FIG. 7. In FIG. 7, for simplicity, description is given of a case in which an octal up counter that repeats counting from "0" (zero) to "7" is used as the counter circuit 14, and the frequencies of the speed control clock signals generated by the respective comparators 16A through 16D are ⅛ of the reference clock signal CLK generated by the oscillator 12. However, in actuality, the frequencies of the speed control clock signals are generally around three figures (digits) lower than the frequency of the reference clock signal CLK.

As described above, in step 100 of the motor driving control processing program, the lower limit values and the upper limit values of the count value range data are set at the pairs of registers provided at the comparators 16A through 16D such that the duty ratios of the outputted speed control clock signals are all 50% and the phases are offset by a predetermined offset amount (in the present exemplary embodiment, an amount corresponding to less than or equal to a time period obtained by dividing one period of the phase excitation signal by 4 that is the number of phase excitation signals that are generated in parallel).

In the example shown in FIG. 7, for example, "1" and "5" are set at the registers 22A and 24A that are provided at the comparator 16A corresponding to the stepping motor 20A, and "2" and "6" are set at the registers 22B and 24B that are provided at the comparator 16B corresponding to the stepping motor 20B.

When the counting of the counter circuit 14 is started in step 104 of the above-described motor driving control processing program, count values from "0" to "7" are repeatedly outputted as shown in FIG. 7 from the counter circuit 14 to the comparing circuits 26A through 26D of the comparators 16A through 16D, respectively.

In accordance therewith, the comparing circuits of the respective comparators compare the set values of one registers (registers 22A through 22D) and the count value, and generate high-level signals if the count value is smaller than the set value, and generate low-level signals if the count value is greater than or equal to the set value. Simultaneously therewith, the comparing circuits of the respective comparators compare the set values of the other registers (registers 24A through 24D) and the count value, and generate high-level signals in cases in which the count value is greater than or equal to the set value, and generate low-level signals in cases in which the count value is less than the set value. The comparing circuits of the respective comparators carry out logical sum operation of the generated two signals, and output the values obtained thereby as the speed control clock signals.

As shown as an example in FIG. 7, the timings of the rises of the speed control clock signals that are obtained as described above are each offset by one pulse of the reference clock signal CLK at the respective stepping motors 20A through 20D.

Figure 8:
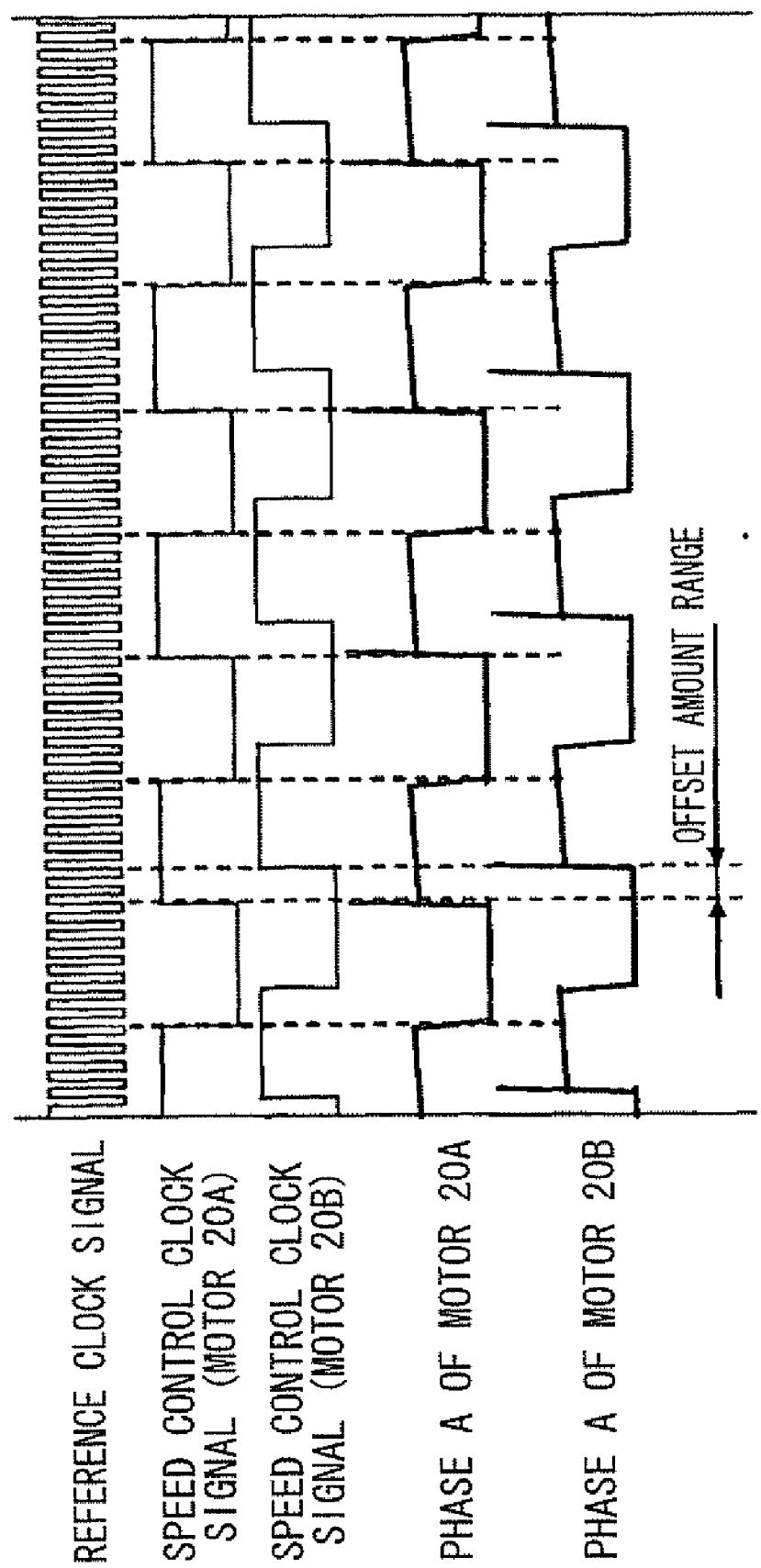
FIG. 8 is a time chart and a waveform diagram showing examples of states of offset of phase excitation signals corresponding to respective stepping motors when of executing the motor driving control processing program relating to the exemplary embodiment.

As a result, as shown as an example in FIG. 8, the timings of the rises of the phase excitation signals corresponding to the respective stepping motors 20A through 20D are respectively offset per phase. Therefore, the frequency of the occurrence of the phenomenon of overlapping of sudden waveform changes, that arises due to back electromotive forces of the stepping motors, may be decreased.

If the time period of the aforementioned sudden waveform change is ascertained in advance by measurement or the like as shown as an example in FIG. 4, a time period that is greater than or equal to the time period of the waveform change may be used as the offset amount.

As described above, in the present exemplary embodiment, the speed control clock signal generator has the counting circuit (the counter circuit 14), and the plural comparing circuits (the comparing circuits 26A through 26D) that are provided in respective correspondence with the plural stepping motors. The reference clock signal is inputted to the counting circuit, and the counting circuit counts the number of pulses of the reference clock signal. The count value is inputted to the respective comparing circuits, and count value range data expressing ranges of the count value are set in advance at the respective comparing circuits. The comparing circuits compare the inputted count value and the ranges of the count value, and generate speed control clock signals by generating pulses when the inputted count value is outside of the range of the count value. Due to predetermined count value range data that express ranges of the count value that differ from one another being set for the plural comparing circuits, the speed control clock signal generator generates speed control clock signals whose phases are different for the respective stepping motors.

Second Exemplary Embodiment

The first exemplary embodiment describes an example of a case in which speed control clock signals are generated by using a number of comparators that is the same as the number of stepping motors that are the objects of control. The present second exemplary embodiment describes an example of a case in which speed control clock signals are generated by using a number of counter circuits that is the same as the number of the object stepping motors.

First, the structure of a stepping motor controlling device 10B relating to the present exemplary embodiment will be described with reference to FIG. 9. Structural elements of FIG. 9 that are the same as those of FIG. 1 are denoted by the same reference numerals as in FIG. 1, and description thereof is omitted.

Figure 9:
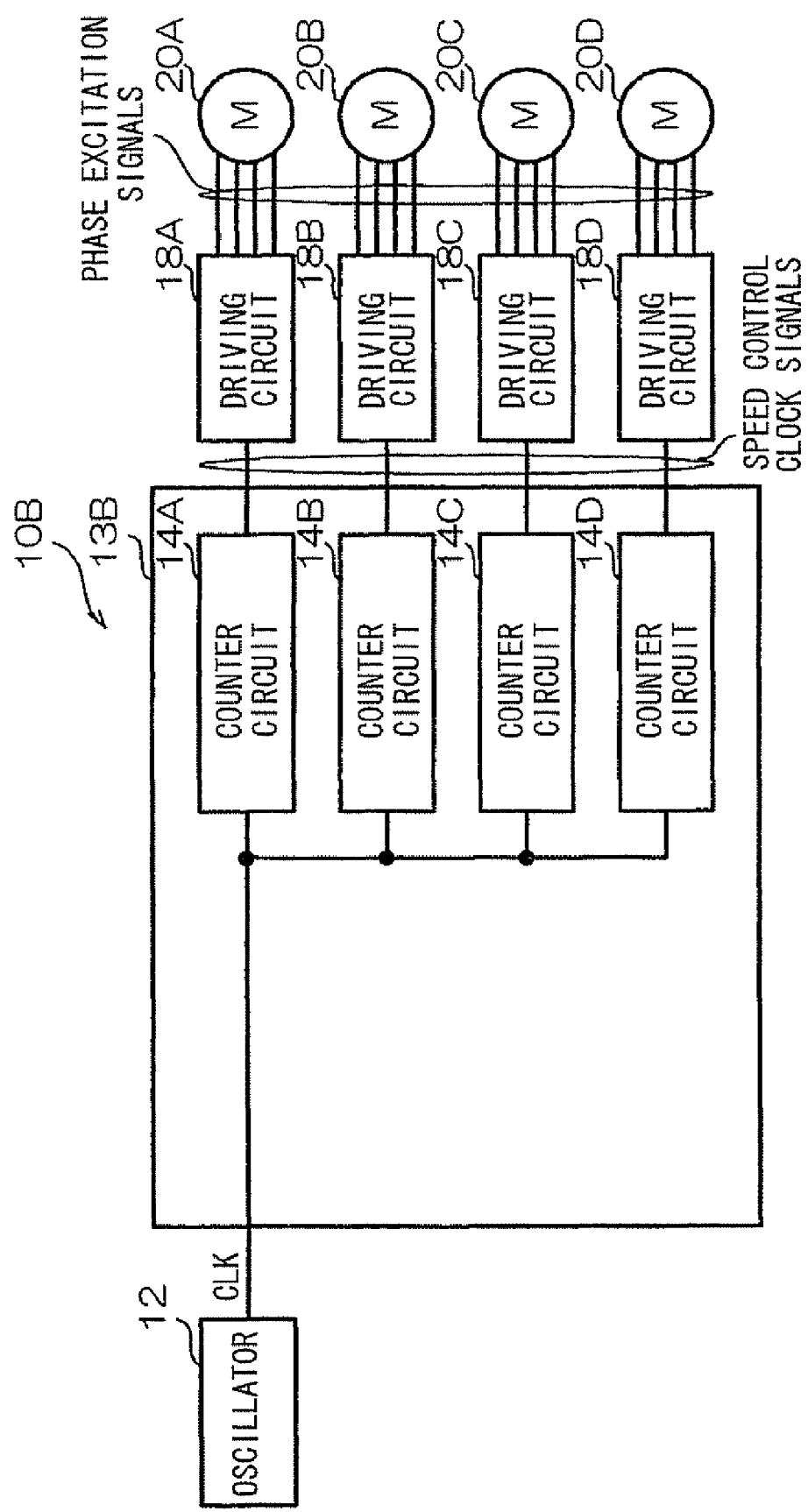
FIG. 9 is a block diagram showing the structure of a stepping motor controlling device relating to a second exemplary embodiment.

As shown in FIG. 9, in the stepping motor controlling device 10B, only the structure of a speed control clock signal generator 13B differs from the stepping motor controlling device 10A relating to the first exemplary embodiment.

The stepping motor controlling device 10B also is described as a device that controls stepping motors that are provided at plural places of a multifunction device having the plural functions of a copier, a printer (image forming device), a fax machine, and the like. However, the stepping motor controlling device 10B is not limited to the same, and may be applied to another device that has plural stepping motors.

The objects of control of the stepping motor controlling device 10B also are the two phase excitation system stepping motors 20A through 20D. However, the stepping motor controlling device 10B is not limited to the same, and stepping motors of other systems such as three phase excitation system, four phase excitation system, five phase excitation system stepping motors may be the objects of control.

In the same way as the speed control clock signal generator 13A relating to the first exemplary embodiment, the speed control clock signal generator 13B also, on the basis of the reference clock signal CLK generated by the oscillator 12, generates, for the plural stepping motors respectively, speed control clock signals that determine the rotational speeds of the stepping motors 20A through 20D.

The speed control clock signal generator 13B has plural counter circuits (four counter circuits 14A through 14D).

The counter circuits 14A through 14D are provided so as to correspond to the plural stepping motors respectively, and the reference clock signal CLK is inputted thereto. The counter circuits 14A through 14D count the number of pulses of the inputted reference clock signal CLK, and generate the speed control clock signals by frequency-dividing the reference clock signal CLK.

Next, the main structure of the electrical system of the stepping motor controlling device 10B will be described with reference to FIG. 10. Note that structural elements of FIG. 10 that are the same as those of FIG. 3 are denoted by the same reference numerals in FIG. 3, and description thereof is omitted.

Figure 10:
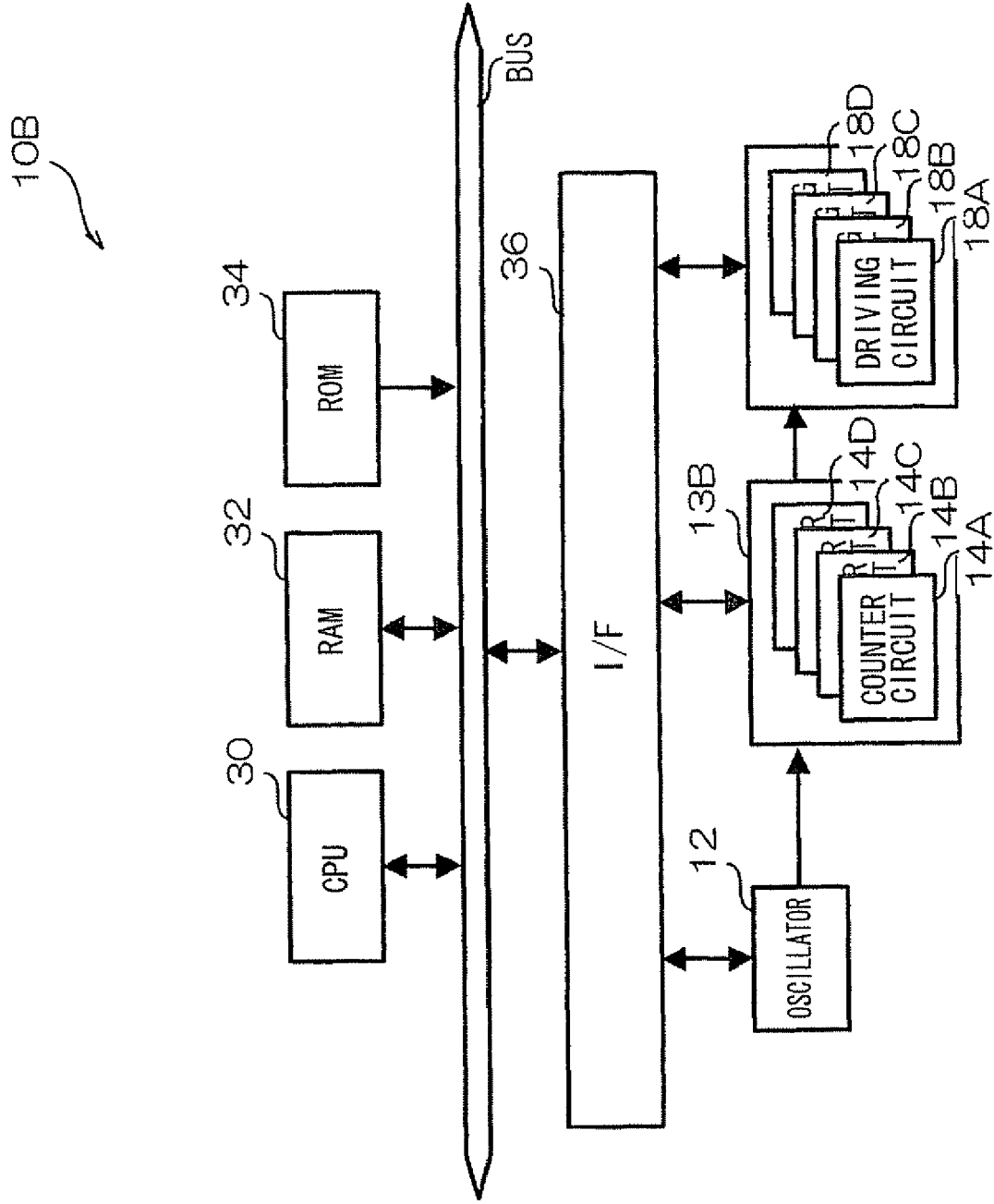
FIG. 10 is a block diagram showing the structure of main portions of an electrical system of the stepping motor controlling device relating to the second exemplary embodiment.

As shown in FIG. 10, the stepping motor controlling device 10B differs from the stepping motor controlling device 10A relating to the first exemplary embodiment with regard to the point that, instead of the speed control clock signal generator 13A (see FIG. 3), the speed control clock signal generator 13B is electrically connected to the system BUS via the I/F 36.

Accordingly, the CPU 30 can control the operation of the speed control clock signal generator 13B via the I/F 36.

The stepping motor controlling device 10B generates speed control clock signals of the respective stepping motors 20A through 20D such that the phases thereof differ from one another, by offsetting, per counter circuit, the timings of the starting of counting by the counter circuits 14A through 14D.

Therefore, at the stepping motor controlling device 10B, data expressing the offset amount of the counting start timings of the respective counter circuits 14A through 14D (hereinafter called "offset amount data") is stored in advance in a predetermined region of the ROM 34.

Note that, in the stepping motor controlling device 10B, data that expresses that the counting start timings are offset each by one pulse of the reference clock signal CLK in the order of the counter circuit 14B, the counter circuit 14C and the counter circuit 14D with the counting start timing of the counter circuit 14A being the reference (0 (zero)), is used as the aforementioned offset amount data.

Further, in the stepping motor controlling device 10B as well, an amount corresponding to less than or equal to a time period that is obtained by dividing one period of the phase excitation signal by the number ("4" in the present exemplary embodiment) of phase excitation signals that are generated in parallel by the driving circuits 18A through 18D, is used as the aforementioned offset amount. As described above, this is to suppress the occurrence of overlapping of the rises of the pulses among the respective phases, in addition to among the same phases of the respective speed control clock signals.

Figure 11:
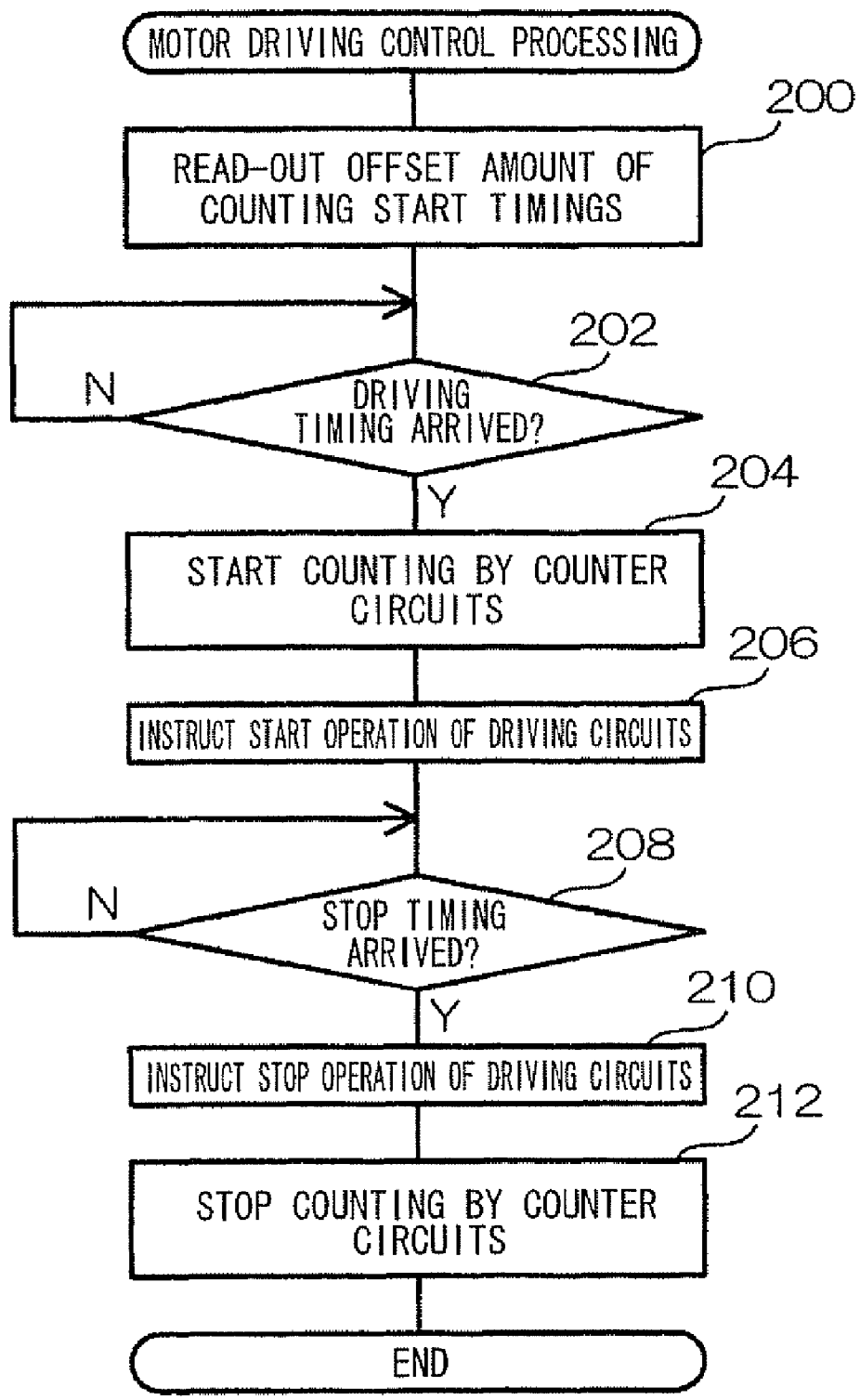
FIG. 11 is a flowchart showing the flow of a motor driving control processing program relating to the second exemplary embodiment.

Operation of the stepping motor controlling device 10B will be described with reference to FIG. 11. FIG. 11 is a flowchart showing the flow of a motor driving control processing program that is executed by the CPU 30 of the stepping motor controlling device 10B. This program is stored in advance in a predetermined region of the ROM 34. Further, for simplicity, description will be given of a case in which rotation of the respective stepping motors 20A through 20D is started at substantially the same timing, and the rotation is stopped at substantially the same timing.

In step 200 of FIG. 11, the offset amount data is read-out from the ROM 34. In step 202, the routine waits until the time of starting the rotational driving of the respective stepping motors 20A through 20D arrives. In step 204, the respective counter circuits 14A through 14D start counting such that the start timings thereof are offset by the offset amount expressed by the offset amount data read-out by the processing of above step 200. Thereafter, in next step 206, start of operation is instructed to the respective driving circuits 18A through 18D.

In step 208, the routine waits until the time of stopping the rotational driving of the respective stepping motors 20A through 20D arrives. In step 210, stopping of operation is instructed to the respective driving circuits 18A through 18D, and in step 212, the respective counter circuits 14A through 14D stop counting. Thereafter, the motor driving control processing program ends.

Due to the execution of the motor driving control processing program relating to the present exemplary embodiment, speed control clock signals such as those shown as an example in FIG. 7 whose phases are offset by a predetermined offset amount (in the present exemplary embodiment, an offset amount corresponding to one pulse of the reference clock signal CLK) are generated. As a result, as shown as an example in FIG. 8, the timings of the rises of the phase excitation signals corresponding to the respective stepping motors 20A through 20D are respectively offset per phase. Therefore, the frequency of the occurrence of the phenomenon of overlapping of sudden waveform changes, that arises due to back electromotive forces of the stepping motors, may be decreased.

In the stepping motor controlling device 10B as well, if the time period of the aforementioned sudden waveform change is ascertained in advance by measurement or the like as shown as an example in FIG. 4, a time period that is greater than or equal to the time period of the waveform change may be used as the offset amount.

In the present exemplary embodiment, the speed control clock signal generator has plural counting circuits (the counter circuits 14A through 14D). The counting circuits are provided in respective correspondence with the plural stepping motors. The reference clock signal is inputted to the counting circuits, and the counting circuits count the number of pulses of the inputted reference clock signal and frequency-divide the reference clock signal, and thereby generate the speed control clock signals. Due to the counting start timings of the plural counting circuits being offset at each of the plural counting circuits, the speed control clock signal generator generates speed control clock signals whose phases are different for the respective stepping motors.

Third Exemplary Embodiment

The third exemplary embodiment describes an example that combines the speed control clock signal generator 13A of the stepping motor controlling device 10A relating to the first exemplary embodiment, and the speed control clock signal generator 13B of the stepping motor controlling device 10B relating to the second exemplary embodiment.

First, the structure of a stepping motor controlling device 10C relating to the present exemplary embodiment will be described with reference to FIG. 12. Structural elements of FIG. 12 that are the same as those of FIG. 1 are denoted by the same reference numerals as in FIG. 1, and description thereof is omitted.

Figure 12:
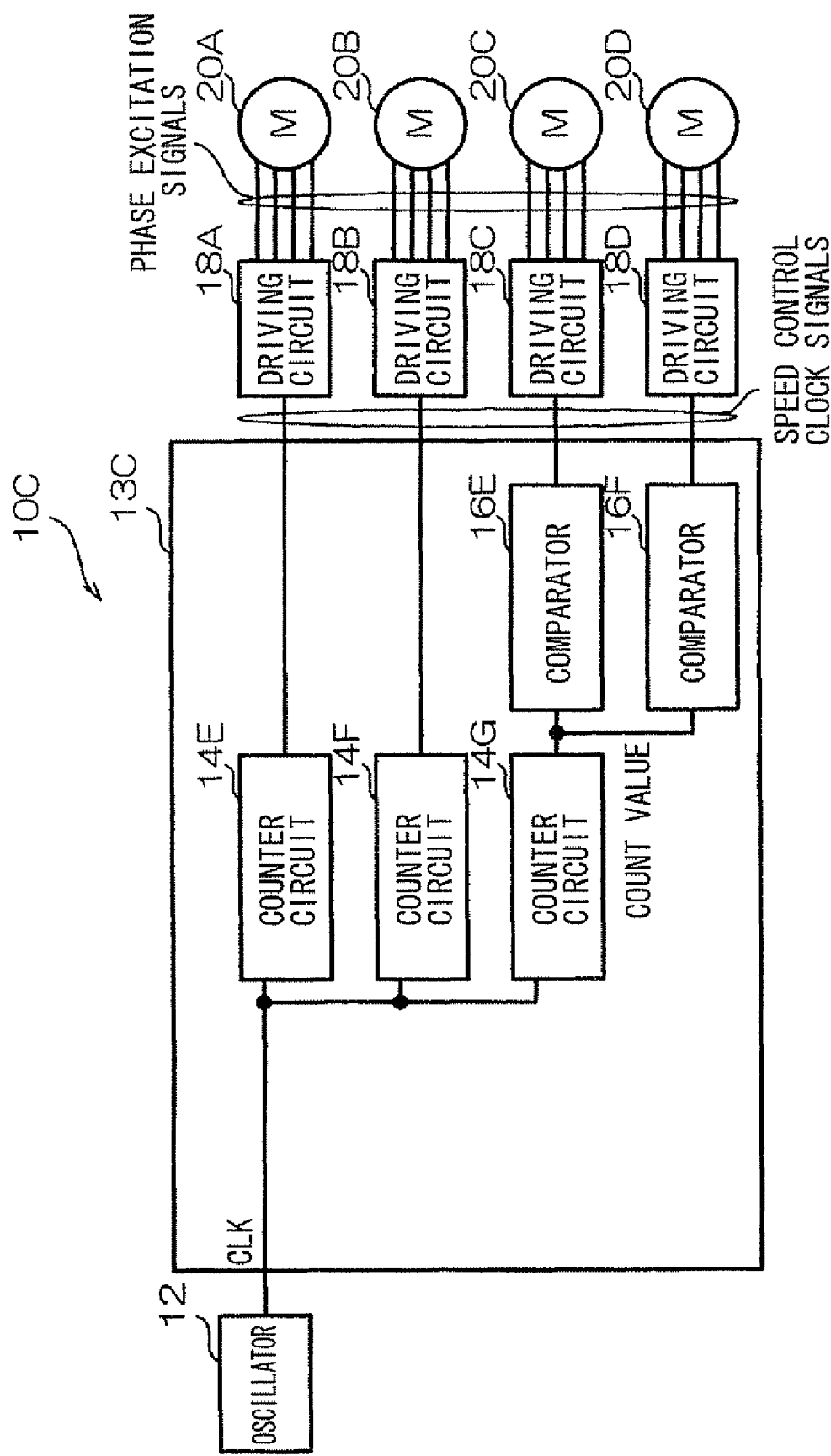
FIG. 12 is a block diagram showing the structure of a stepping motor controlling device relating to the third exemplary embodiment.

As shown in FIG. 12, in the stepping motor controlling device 10C, only the structure of a speed control clock signal generator 13C differs from the stepping motor controlling device 10A relating to the first exemplary embodiment.

The stepping motor controlling device 10C also is described as a device that controls stepping motors that are provided at plural places of a multifunction device having the plural functions of a copier, a printer (image forming device), a fax machine, and the like. However, the stepping motor controlling device 10C is not limited to the same, and may be applied to another device that has plural stepping motors.

Further, the objects of control of the stepping motor controlling device 10C also are the two phase excitation system stepping motors 20A through 20D. However, the stepping motor controlling device 10C is not limited to the same, and stepping motors of other systems such as three phase excitation system, four phase excitation system, five phase excitation system stepping motors may be the objects of control.

In the same way as the speed control clock signal generator 13A relating to the first exemplary embodiment, the speed control clock signal generator 13C also, on the basis of the reference clock signal CLK generated by the oscillator 12, generates, for the plural stepping motors respectively, speed control clock signals that stipulate the rotational speeds of the stepping motors 20A through 20D.

The speed control clock signal generator 13C has plural counter circuits (three counter circuits 14E through 14G), and plural comparators (two comparators 16E through 16F).

The counter circuit 14E and the counter circuit 14F are provided so as to correspond to some of the plural stepping motors (the stepping motor 20A and the stepping motor 20B), and the reference clock signal CLK is inputted thereto. The counter circuits 14E and 14F count the number of pulses of the inputted reference clock signal CLK and frequency-divide the reference clock signal CLK, and thereby generate the speed control clock signals for the some (one or more) of the stepping motors.

The counter circuit 14G is provided so as to correspond to the other (the rest of) stepping motors (the stepping motor 20C and the stepping motor 20D). The reference clock signal CLK is inputted to the counter circuit 14G, and the counter circuit 14G counts the number of pulses of the inputted reference clock signal CLK.

The comparator 16E and the comparator 16F are provided so as to correspond to the other stepping motors, and the count value counted by the counter circuit 14G is inputted thereto. Count value range data, that express ranges of the count value, are set in advance at the comparators 16E through 16F. The comparator 16E through 16F compares the inputted count value and the range of the count value. In a case in which the inputted count value is outside of the count value range, the comparator 16E through 16F generates pulses, and thereby generates the speed control clock signal for the other stepping motor.

The comparator 16E and the comparator 16F have the same structure as the comparators 16A through 16D relating to the first exemplary embodiment (see FIG. 2), and the lower limit values and the upper limit values of the count value range data are set in the pairs of registers provided respectively thereat.

By the comparing circuits that are provided thereat, the comparator 16E and the comparator 16F compare the count value inputted from the counter circuit 14G and the range of the count value expressed by the count value range data stored in advance in the pairs of registers. In a case in which the inputted count value is outside of the range of the count value, the comparator 16E, the comparator 16F generates pulses, and thereby generates a speed control clock signal.

Next, the main structure of the electrical system of the stepping motor controlling device 10C will be described with reference to FIG. 13. Note that structural elements of FIG. 13 that are the same as those of FIG. 3 are denoted by the same reference numerals in FIG. 3, and description thereof is omitted.

Figure 13:
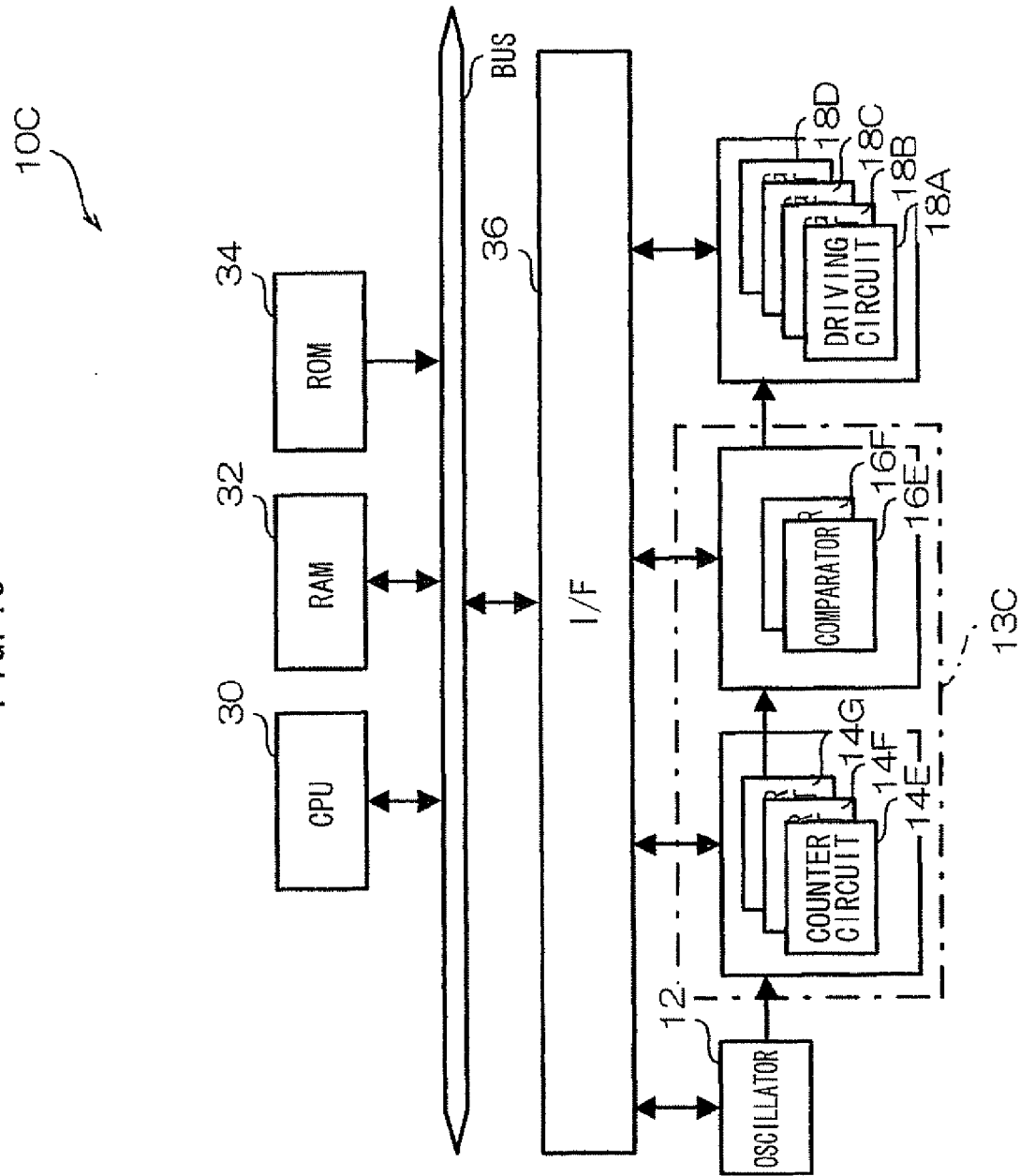
FIG. 13 is a block diagram showing the structure of main portions of an electrical system of the stepping motor controlling device relating to the third exemplary embodiment.

As shown in FIG. 13, the stepping motor controlling device 10C differs from the stepping motor controlling device 10A relating to the first exemplary embodiment with regard to the point that, instead of the speed control clock signal generator 13A (see FIG. 3), the speed control clock signal generator 13C is electrically connected to the system BUS via the I/F 36.

Accordingly, the CPU 30 can control the operation of the speed control clock signal generator 13C via the I/F 36.

The stepping motor controlling device 10C carries out control to generate the speed control clock signals of the respective stepping motors 20A through 20D such that the phases thereof differ from one another, by offsetting, per counter circuit, the timings of the starting of counting by the counter circuits 14E through 14G.

Therefore, at the stepping motor controlling device 10C, offset amount data, that expresses the offset amount of the counting start timings of the respective counter circuits 14E through 14G, is stored in advance in a predetermined region of the ROM 34.

In this regard, at the stepping motor controlling device 10C, data that expresses that the counting start timings are offset each by one pulse of the reference clock signal CLK in the order of the counter circuit 14F and the counter circuit 14G with the counting start timing of the counter circuit 14E being the reference (0 (zero)), is used as the offset amount data.

In the stepping motor controlling device 10C as well, an amount corresponding to less than or equal to a time period that is obtained by dividing one period of the phase excitation signal by the number ("4" in the present exemplary embodiment) of phase excitation signals that are generated in parallel by the driving circuits 18A through 18D, is used as the offset amount. As described above, this is to suppress the occurrence of overlapping of the rises of the pulses among the respective phases, in addition to among the same phases of the respective speed control clock signals.

Figure 14:
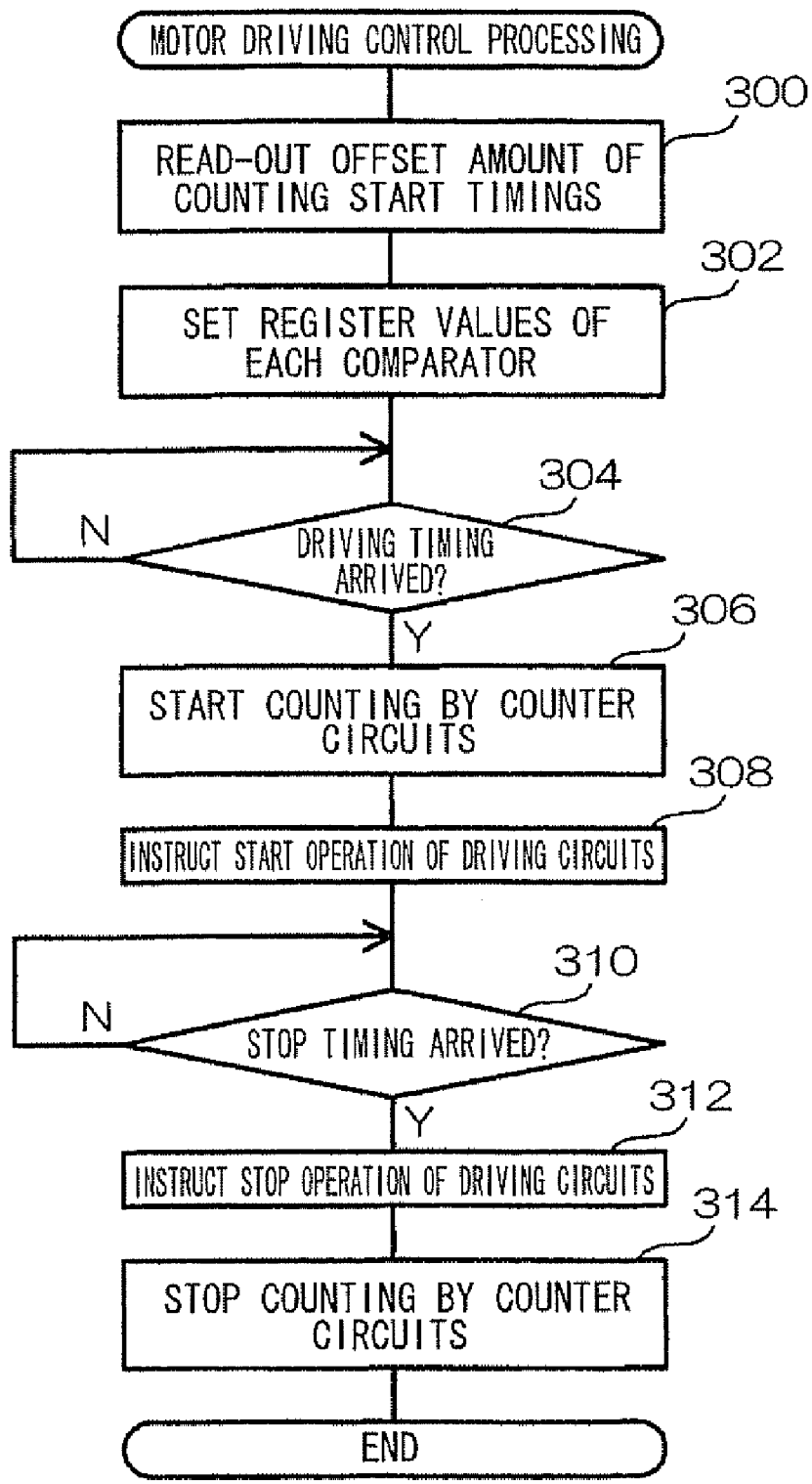
FIG. 14 is a flowchart showing the flow of a motor driving control processing program relating to the third exemplary embodiment.

Operation of the stepping motor controlling device 10C will be described with reference to FIG. 14. FIG. 14 is a flowchart showing the flow of a motor driving control processing program that is executed by the CPU 30 of the stepping motor controlling device 10C. This program is stored in advance in a predetermined region of the ROM 34. For simplicity, description will be given of a case in which rotation of the respective stepping motors 20A through 20D is started at substantially the same timing, and the rotation is stopped at substantially the same timing.

In step 300 of FIG. 14, the offset amount data is read-out from the ROM 34. In step 302, the count value range data are set for the pair of registers that are provided at the comparator 16E and the pair of registers that are provided at the comparator 16F.

In the comparator 16E and the comparator 16F of the stepping motor controlling device 10C, the lower limit values and the upper limit values of the count value range data are set at the pairs of registers provided at the comparators 16E, 16F such that the duty ratios of the outputted speed control clock signals will be both 50% and the phases are offset by a predetermined offset amount.

In step 304, the routine waits until the time of starting the rotational driving of the respective stepping motors 20A through 20D arrives. In step 306, the respective counter circuits 14E through 14G are made to start counting such that the start timings thereof are offset by the offset amount expressed by the offset amount data read-out by the processing of above step 300. In step 308, start of operation is instructed to the respective driving circuits 18A through 18D.

In step 310, the routine waits until the time of stopping the rotational driving of the respective stepping motors 20A through 20D arrives. In step 312, the respective driving circuits 18A through 18D are instructed to stop operations, and in step 314, the respective counter circuits 14E through 14G stop counting. Thereafter, the present motor driving control processing program ends.

Due to the execution of the motor driving control processing program relating to the present exemplary embodiment, speed control clock signals such as those shown as an example in FIG. 7 whose phases are offset by a predetermined offset amount (in the present exemplary embodiment, an offset amount corresponding to one pulse of the reference clock signal CLK) are generated. As a result, as shown as an example in FIG. 8, the timings of the rises of the phase excitation signals corresponding to the respective stepping motors 20A through 20D are respectively offset per phase. Therefore, the frequency of the occurrence of the phenomenon of overlapping of sudden waveform changes, that arises due to back electromotive forces of the stepping motors, may be decreased.

In the stepping motor controlling device 10C as well, if the time period of the aforementioned sudden waveform change is ascertained in advance by measurement or the like as shown as an example in FIG. 4, a time period that is greater than or equal to the time period of the waveform change may be used as the offset amount.

In the present exemplary embodiment, the speed control clock signal generator has first counting circuits (the counter circuit 14E and the counter circuit 14F), a second counting circuit (the counter circuit 14G), and plural comparing circuits (the comparing circuits provided at the comparator 16E and the comparator 16F). The first counting circuits are provided in correspondence with some (the stepping motors 20A through 20B) of the plural stepping motors. The reference clock signal is inputted to the first counting circuits, and the first counting circuits count the number of pulses of the inputted reference clock signal and frequency-divide the reference clock signal, and thereby generate the speed control clock signals for the some of the stepping motors. The second counting circuit is provided in correspondence with the other (the rest of the) stepping motors (the stepping motors 20C through 20D). The reference clock signal is inputted to the second counting circuit, and the second counting circuit counts the number of pulses of the inputted reference clock signal. The plural comparing circuits are also provided in correspondence with the other the plural stepping motors. The count value counted by the second counting circuit is inputted to the plural comparing circuits, and count value range data expressing ranges of the count value are set in advance thereat. The comparing circuits respectively compare the inputted count value and the range of the count value expressed by the set count value range data. If the inputted count value is outside of the range of the count value, the comparing circuit generates pulses, and thereby generates a speed control clock signal for the other stepping motor. The controller offsets the counting start times of the first counting circuits and the second counting circuit at each of the first counting circuits and the second counting circuit, and sets in advance, for the plural comparing circuits, the predetermined count value range data that express ranges of the count value that differ from one another at the respective comparing circuits.

Exemplary embodiments have been described above, but the technical scope of the present invention is not limited to the scope recited in the exemplary embodiments. Various modifications and improvements can be added to the exemplary embodiments within a scope that does not deviate from the gist of the invention, and other embodiments including such modifications and improvements are also included in the technical scope of the present invention.

The above-described exemplary embodiments do not limit the invention recited in the claims, and all of the combinations of features described in the exemplary embodiments are not necessarily essential to the present invention. The present invention in various stages is included in the above-described exemplary embodiments, and a variety of inventions can be contemplated from combinations according to the circumstances of the plural features that are disclosed. Even if several of the features are omitted from all of the features that are shown in the above exemplary embodiments, structures from which the several features are omitted can be contemplated as the present invention.

Figure 15:
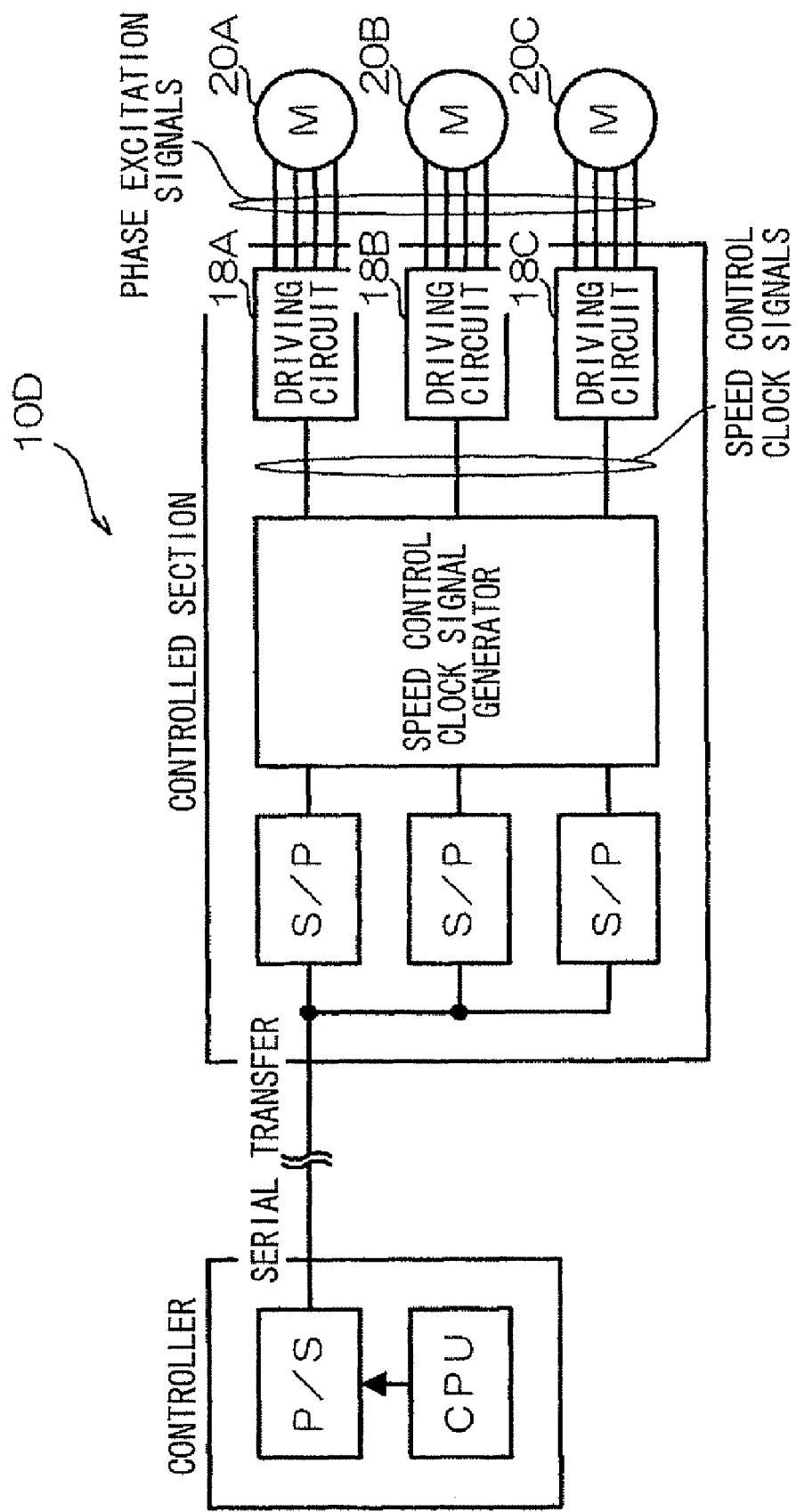
FIG. 15 is a block diagram showing the structure of a stepping motor controlling device relating to another exemplary embodiment.

For example, the above-described respective exemplary embodiments do not make any particular mention of the form of connection between, on the one hand, the speed control clock signal generator and the driving circuits (hereinafter called the "controlled section") and, on the other hand, the controlling section that controls the operations of the speed control clock signal generator and the driving circuits. However, for example, as shown as an example in FIG. 15, the controlling section and the controlled section may be electrical connected by a transfer path that can carry out serial transfer. In this case, a parallel/serial converter (denoted as "P/S" in FIG. 15) is needed at the controlling section, and serial/parallel converters (denoted as "S/P" in the figure) are needed at the controlled section. However, at a transfer path that can carry out the serial transfer, the number of wires may be markedly reduced as compared with a transfer path that carries out parallel transfer.

The above respective exemplary embodiments describe cases in which there are four of the stepping motors that are the objects of control. However, embodiments are not limited to the same, and can correspond to any number of stepping motors provided that it is a plural number. In a case in which the number of stepping motors that are the objects of control is a plural number other than four, the numbers of the counter circuits and the comparators may be increased or decreased in accordance with the number of stepping motors.

For simplicity, the exemplary embodiments describe cases in which, in the motor driving control processing program, the stepping motors are rotated at constant rotational speeds from the start to the end of the rotational driving. However, embodiments are not limited to the same. For example, in order to suppress the occurrence of step-out of the stepping motors, the rotational speeds may be changed at each of the start of the rotational driving, a steady time during which the rotational speeds are made to be uniform at a desired rotational speed, and the end of the rotational driving. In this case, it suffices that the phases of the speed control clock signals are made to be different, as in the above-described exemplary embodiments, at least at the steady time. This is because the time periods at the start of and at the end of the rotational driving will be extremely short.

The above respective exemplary embodiments describe cases in which the comparing circuit that generates pulses if the count value inputted from the counter circuit is outside of a range of the count value expressed by count value range data is used. However, embodiments are not limited to the same, and a comparing circuit that generates pulses if the count value inputted from the counter circuit is within a range of the count value expressed by count value range data may be used.

The exemplary embodiments describe cases in which an amount, that corresponds to the time period of one pulse of the reference clock signal CLK, is used as the offset amount of each speed control clock signal. However, embodiments are not limited to the same. Another offset amount such as, for example, an amount corresponding to a time period that is greater than or equal to the time period of two pulses of the reference clock signal CLK, or the like may be used. In this case as well, an amount, that corresponds to less than or equal to a time period obtained by dividing one period of the phase excitation signal by the number of phase excitation signals that are generated in parallel by the plural driving circuits, may be used as the offset amount. Alternately, if the time period of the sudden waveform change of the phase excitation signal is ascertained in advance, an amount corresponding to a time period that is greater than or equal to that time period may be used as the offset amount.

The above-described respective exemplary embodiments do not make any particular mention of cases in which fuses are provided in order to ensure stability. However, also in cases in which fuses are provided, peak values of the electric power for driving the stepping motors can be suppressed, and as a result, the occurrence of blowing of fuses is suppressed. Note that, in this case, fuses that can handle rush current can be used.

Further, no particular mention is made in the above-described exemplary embodiments of providing a feedback control circuit that carries out feedback control in order to make the supplied electric power be a desired electric power in an unillustrated power supply circuit that supplies the electric power to generate the phase excitation signals. However, also in cases in which a feedback control circuit is provided, peak values of the electric power for driving the stepping motors can be suppressed, and as a result, malfunctioning of the feedback control circuit may be suppressed.

The above third exemplary embodiment describes a case in which there are two of the counter circuits that serve as the first counting circuits, and one counter circuit that serves as the second counting circuit. However, these numbers are examples, and combinations of numbers other than these may be used.

Further, although the third exemplary embodiment describes a case in which two comparators are used, the number of comparators is not limited to this number.

The respective exemplary embodiments describe cases in which the speed control clock signal generator is structured by counter circuits and comparators, but embodiments are not limited to the same. Another structure, that can generate speed control clock signals of each of plural stepping motors such that the phases thereof differ from one another, may be used.

Cases are described in the exemplary embodiments in which the motor driving control processing programs are stored in advance in the ROM 34. However, embodiments are not limited to the same. These programs may be provided in a state of being stored on a computer-readable recording medium such as a CD-ROM, a DVD-ROM, a USB memory, or the like, or may be distributed in a form of computer data signal embodied in a carrier wave via a wired or wireless communication means.

Further, the structures of the stepping motor controlling devices described in the above exemplary embodiments (see FIG. 1 through FIG. 3, FIG. 9, FIG. 10, FIG. 12, FIG. 13) are examples and unnecessary regions may be omitted, new regions may be added, and the arranged positions of the respective regions may be changed within a scope that does not deviate from the gist of the present invention.

Moreover, the flows of the motor driving control processing programs described in the above exemplary embodiments (see FIG. 6, FIG. 11, FIG. 14) are examples and unnecessary steps may be omitted, new steps may be added, and the order of processings may be switched within a scope that does not deviate from the gist of the present invention.

What is claimed is:

1. A stepping motor controlling device comprising:
a first clock signal generator that generates a reference clock signal that is a reference for operation timings of rotationally driving a plurality of stepping motors;
a second clock signal generator that, on the basis of the reference clock signal, generates, for each of the plurality of stepping motors, speed control clock signals that determine respective rotational speeds of the stepping motors;
a plurality of drivers that are provided respectively for the plurality of stepping motors, and that, on the basis of the speed control clock signals for the respective stepping motors, generate pulse excitation signals and input the pulse excitation signals to the stepping motors to rotationally drive the stepping motors; and
a controller that controls the second clock signal generator to generate the speed control clock signals such that phases of the respective speed control clock signals for the plurality of stepping motors differ from one another,
wherein the second clock signal generator comprises:
a counting circuit to which the reference clock signal is inputted, and that counts a number of pulses of the reference clock signal; and
a plurality of comparing circuits that are provided respectively for the plurality of stepping motors, and to which a count value from the counting circuit is inputted, and at which are set in advance count value range data expressing ranges of the count value, the comparing circuits comparing the inputted count value and the ranges of the count value, and generating pulses according to whether the inputted count value is within the range or outside of the range of the count value, and
wherein the controller sets in advance, for the plurality of comparing circuits, count value range data expressing ranges of the count value that differ from one another at each of the plurality of comparing circuits.

2. The stepping motor controlling device of claim 1, wherein the second clock signal generator comprises a plurality of counting circuits that are provided respectively for the plurality of stepping motors, and to which the reference clock signal is inputted, the plurality of counting circuits counting a number of pulses of the inputted reference clock signal and frequency-dividing the reference clock signal, and the controller respectively offsets timings at which each of the plurality of counting circuits starts counting.

3. The stepping motor controlling device of claim 1, wherein the counting circuit comprises:
   a first counting circuit is provided for one or more of the plurality of stepping motors and the first counting circuit counting the number of pulses of the inputted reference clock signal and frequency-dividing the reference clock signal to generate speed control clock signals for the one or more stepping motors;
   a second counting circuit that is provided for the stepping motors other than the one or more stepping motors, and to which the reference clock signal is inputted, the second counting circuit counting the number of pulses of the inputted reference clock signal; and wherein
   the plurality of comparing circuits are provided respectively for the other stepping motors, and to which a count value of the second counting circuit is inputted, and at which are set in advance count value range data expressing ranges of the count value, the comparing circuits comparing the inputted count value and the ranges of the count value, and generating pulses according to whether the inputted count value is within the range or outside of the range of the count value to generate speed control clock signals for the stepping motors other than the one or more stepping motors, and
   wherein the controller respectively offsets timings at which the first counting circuit and the second counting circuit start counting, and sets in advance, for the plurality of comparing circuits, count value range data expressing ranges of the count value that differ from one another at each of the plurality of comparing circuits.

4. The stepping motor controlling device of claim 1, wherein an offset amount of phases of the plurality of speed control clock signals is an amount corresponding to less than or equal to a time period obtained by dividing one period of the phase excitation signal by a number of phase excitation signals that are generated in parallel by the plurality of drivers.

5. A non-transitory computer readable storage medium storing a program causing a computer to execute control processing of a plurality of stepping motors, the control processing comprising:
   generating a reference clock signal that is a reference for operation timings of rotationally driving the plurality of stepping motors;
   on the basis of the reference clock signal, generating, for each of the plurality of stepping motors, speed control clock signals that determine respective rotational speeds of the stepping motors, the respective speed control clock signals being generated such that phases thereof differ from one another;
   on the basis of the speed control clock signals of the respective stepping motors, generating pulse excitation signals, inputting the pulse excitation signals to the stepping motors to rotationally drive the stepping motors;
   counting a number of pulses of the reference clock signal;
   setting in advance count value range data expressing ranges of the count value that differ from one another, for the plurality of stepping motors respectively; and
   for the plurality of stepping motors respectively, comparing the count value and the range of the count value, and generating pulses according to whether the inputted count value is within the range or outside of the range of the count value.

6. The storage medium of claim 5, wherein the generating of the speed control clock signals comprises:
   for the plurality of stepping motors respectively, counting a number of pulses of the reference clock signal and frequency-dividing the reference clock signal, and respectively offsetting timings at which each of the plurality of stepping motors start counting.

7. The storage medium of claim 5, wherein the counting the number of pulses of the reference clock signal comprises:
   with respect to each of one or more of the plurality of stepping motors, carrying out a first counting that counts a number of pulses of the reference clock signal, and frequency-dividing the reference clock signal to generate speed control clock signals for the one or more stepping motors;
   with respect to each of the stepping motors other than the one or more stepping motors, carrying out a second counting that counts the number of pulses of the reference clock signal; and
   with respect to each of the stepping motors other than the one or more stepping motors, setting in advance count value range data expressing ranges of the count value that differ from one another; and
   with respect to each of the stepping motors other than the one or more stepping motors, comparing the count value and the range of the count value, and generating pulses according to whether the inputted count value is within the range or outside of the range of the count value to generate speed control clock signals for each of the one or more stepping motors,
   wherein timings at which counting starts are offset in the first counting and the second counting.

8. The storage medium of claim 5, wherein an offset amount of phases of the plurality of speed control clock signals is less than or equal to a time period obtained by dividing one period of the phase excitation signal by a number of phase excitations signals that are generated in parallel.

9. A stepping motor controlling method comprising:
   generating a reference clock signal that is a reference for operation timings of rotationally driving a plurality of stepping motors;
   on the basis of the reference clock signal, generating, for each of the plurality of stepping motors, speed control clock signals that determine respective rotational speeds of the stepping motors, the respective speed control clock signals being generated such that phases thereof differ from one another;
   on the basis of the speed control clock signals of the respective stepping motors, generating pulse excitation signals, inputting the pulse excitation signals to the stepping motors to rotationally drive the stepping motors;
   counting a number of pulses of the reference clock signal;
   setting in advance count value range data expressing ranges of the count value that differ from one another, for the plurality of stepping motors respectively; and for the plurality of stepping motors respectively, comparing the count value and the range of the count value, and generating pulses according to whether the inputted count value is within the range or outside of the range of the count value.

* * * * *